United States Patent
Bhatnagar et al.

(10) Patent No.: US 9,528,001 B2
(45) Date of Patent: Dec. 27, 2016

(54) PREPARATION OF POLYMER MODIFIED BITUMEN (PMB) FROM POLYETHYLENE TEREPHTHALATE (PET) DERIVED POLYAMIDO AMINE

(71) Applicant: INDIAN OIL CORPORATION LTD., Mumbai, Maharashtra (IN)

(72) Inventors: Akhilesh Kumar Bhatnagar, Faridabad (IN); Rabindra Kumar Padhan, Faridabad (IN); Anurag Ateet Gupta, Faridabad (IN); Naduhatty Selai Raman, Faridabad (IN)

(73) Assignee: INDIAN OIL CORPORATION LTD., Mumbai (IN)

( * ) Notice: Subject to any disclaimer, the term of this patent is extended or adjusted under 35 U.S.C. 154(b) by 0 days.

(21) Appl. No.: 14/659,089

(22) Filed: Mar. 16, 2015

(65) Prior Publication Data

US 2015/0274974 A1    Oct. 1, 2015

(30) Foreign Application Priority Data

Mar. 26, 2014   (IN) .......................... 1049/MUM/2014

(51) Int. Cl.
*C08L 95/00* (2006.01)
*C08L 75/02* (2006.01)
*C08L 75/12* (2006.01)
*C10C 3/02* (2006.01)
*C08G 18/60* (2006.01)
*C08G 18/64* (2006.01)
*C08G 73/02* (2006.01)

(52) U.S. Cl.
CPC ............. *C08L 95/00* (2013.01); *C08G 18/603* (2013.01); *C08G 18/6476* (2013.01); *C08L 75/02* (2013.01); *C08L 75/12* (2013.01); *C10C 3/026* (2013.01); *C08G 73/028* (2013.01); *C08L 2555/80* (2013.01)

(58) Field of Classification Search
CPC ...... C08L 95/00; C08L 75/00; C08G 18/6476; C08G 73/028; C10C 3/026
See application file for complete search history.

(56) References Cited

U.S. PATENT DOCUMENTS

| | | | | |
|---|---|---|---|---|
| 4,724,245 | A * | 2/1988 | Lalanne ................. | C08L 75/04 524/60 |
| 6,271,305 | B1 * | 8/2001 | Rajalingam ........ | C08G 18/6476 427/138 |
| 9,018,279 | B1 * | 4/2015 | Bangs ....................... | C08J 3/20 521/41 |

(Continued)

FOREIGN PATENT DOCUMENTS

| EP | 0561471 A1 | 9/1993 |
|---|---|---|
| EP | 0667886 B1 | 4/1997 |

(Continued)

*Primary Examiner* — Michael A Salvitti
(74) *Attorney, Agent, or Firm* — Maschoff Brennan (57) ABSTRACT

The present invention relates a novel approach to prepare Polymer Modified Bitumen by using terephthalamide additives, derived from PET, for improving bitumen quality. Particularly, the present invention provides a process to utilize waste PET, which is a threat to environment and is available commercially in different physical forms, for conversion into industrially useful additive for bituminous product.

14 Claims, 3 Drawing Sheets

(a)

(b)

(56) References Cited

U.S. PATENT DOCUMENTS

2005/0124736 A1* 6/2005 Bonnet .................. C08L 95/00
524/59
2015/0274974 A1* 10/2015 Bhatnagar .............. C08L 75/02
524/705

FOREIGN PATENT DOCUMENTS

| WO | 2012/007418 A1 | 1/2012 |
| WO | 2013/118057 A1 | 2/2013 |

* cited by examiner (a) (b)

PREPARATION OF POLYMER MODIFIED BITUMEN (PMB) FROM POLYETHYLENE TEREPHTHALATE (PET) DERIVED POLYAMIDO AMINE

FIELD OF THE INVENTION

The present invention relates a novel approach to prepare Polymer Modified Bitumen by using terephthalamide additives, derived from PET, for improving bitumen quality.

BACKGROUND OF THE INVENTION

Bitumen is a dark-brown to black sticky material, solid or semi-solid in consistency, in which the primary constituents are a mixture of paraffinic and aromatic hydrocarbons and heterocyclic compounds containing sulfur, nitrogen and oxygen. In view of emerging need to improve bitumen properties, the use of chemical additives, particularly Polymers, is currently a much investigated subject.

In recent years, one of the important developments in the field of alternate application of virgin or used plastic/rubber material (mainly SBS and EVA type), is their use in making Polymer/Rubber Modified Bitumen (PMBs/RMBs) as value added product of Bitumen. Presently, PMBs/RMBs are used in huge quantities in making road highways infrastructure. PMBs/RMBs offer some definitive advantages over conventional bitumen such as lower susceptibility to daily and seasonal temperature variations, higher resistance to deformation at elevated pavement temperatures, better age resistance properties, better adhesion, less cracking even in heavy traffic conditions etc. The use of PMBs/RMBs, in India, has just begun during last decade particularly under highway development program.

Disposal of plastic material in general and PET based products like bottles for water/soft drinks etc., in particular, is one of identified factor for current pollution. Global efforts are underway, to recycle PET through both chemical and mechanical routes. Unfortunately, under mechanical recycling route, in particular, many prior art reported processes are not efficient and the quality of derived product remains questionable for recycling purposes.

On the other hand, "chemical recycling" which includes depolymerization of PET chains has been widely mentioned in the prior art. Five major approaches such as Glycolysis, Alcoholysis, Hydrolysis, Saponification and Aminolysis have been reported in several scientific literatures.

In aminolysis route our approach consisted of subjecting PET and amines such as ethanol amine, polyamine to temperature conditions from about 100° to 200° C. both under catalytic and non-catalytic conditions. PET on decomposition, as reported in our earlier patent (Application number: PCT/IB2013/050974), converts into product or product mixtures which are mainly terephthalamide derivatives.

One of the major challenge and a desirable approach in the aminolysis reaction is to develop products that can be used on an industrial scale. In our earlier patent (Application number: PCT/IB2013/050974) we have explored the process for utilization of terephthalamide synthesized from PET via aminolysis reaction as an anti-stripping agent for bitumen.

Lee, Sang-Yum; recently showed that the dimethylphenol (DMP) was added to the neat asphalt and polymerization carried out autonomously, without adding any external catalyst for the polymerization, only with oxygen molecules in the air. The polymer produced in the asphalt was polyphenyleneoxide (PPO) and it enhanced the mechanical properties of the asphalt.

EP 0561471 A1 discloses the bituminous composition comprising, block copolymer and conjugated diene and an acrylic monomer such as an alkyl methacrylate to form PMB. WO 2012007418 A1: discloses a Polyurethan-/Polyisocyanurat polymer obtainable from the reaction of an isocyanate-terminated with POLYOL outside of bitumen and then blend with bitumen. EP 0667886 B1 describes bituminous composition comprising a bituminous, conjugated diolefin and an acrylic monomer of a polyfunctional amine having at least two amino groups.

There arise needs to provide a process to utilize waste PET, which is a threat to environment and is available commercially in different physical forms, for conversion into industrially useful additive for bituminous product.

SUMMARY OF THE INVENTION

An object of the present invention is to provide a process to utilize waste PET, which is a threat to environment and is available commercially in different physical forms, for conversion into industrially useful additive for bituminous product. Another object of the present invention is to provide a process for effective and bulk use of aminolysed product of PET polymers.

A further object of the invention is to provide a process for preparation of a bituminous cement mixture as per Indian Standard and ASTM Standard as well as the combination of that mixture with an aggregate in a form for road paving, i.e. a bituminous concrete, which has high temperature susceptibility (Table-3), and high temperature performance properties (Table-2).

Yet another object of the invention is to provide a novel process comprising the reaction of terephthalamide derived from the reactions of amines such as primary, secondary and tertiary amines and PET with isocyanates and more particularly Methylene Diphenyl Diisocyanate (MDI), in bitumen.

Another object of the invention is to provide a process for improving low temperature susceptibility properties of bitumen with such chemical compounds.

DETAILED DESCRIPTION OF THE INVENTION

The present invention discloses a method of preparation of novel polymer modified asphalt binder compositions that are made by reacting a Poly-isocyanate with amido amine derivative.

An aspect of the present invention discloses a process for preparing modified bitumen from amido amines or polyamido amines and isocyanate or polyisocyante.

In an aspect the present invention provides a process for preparing modified bitumen comprising, reacting amido amines or polyamido amines; isocyanate or polyisocyanate; and bitumen in a solvent to obtain modified bitumen.

In another aspect of the present invention, amido amines or polyamido amines are reacted with isocyanate or polyisocyanate, prior to reacting with bitumen.

In another aspect of the present invention, amido amines or polyamido amines; isocyanate or polyisocyanate; and bitumen are reacted simultaneously.

In another aspect of the present invention, amido amines or polyamido amines and isocyanate or polyisocyanate are reacted to obtain a polyureathane.

In another aspect of the present invention, amido amines or polyamido amines and isocyanate or polyisocyanate are reacted to obtain a polyurea.

Another aspect of the present invention discloses a bituminous cement mixture comprising polyurethane or polyurea polymers in body of bitumen.

The polyurethane or polyurea polymers are formed in the body of the bitumen matrix in the following manner:

where, $R=(Ph\text{-}CO\text{---}NH)_{1\text{-}5}(CH_2\text{---}CH_2)_{1\text{-}8}\text{---}(NH)_{0\text{-}8}$;
$R'=Ph$, $Ph\text{-}CH_2\text{-}Ph$, $Ph\text{-}CH_3$, $(\text{---}CH_2\text{---})_{1\text{-}10}$ In an aspect of the present invention, bituminous cement mixture as described herein comprises of a statistical mixture of compounds encompassed by the general structure of formula $R'_1NCH_2CH_2\text{---}(CH_2CH_2NH)_n\text{---}CO\text{---}C_6H_4\text{---}CO\text{---}(NHCH_2CH_2)_nCH_2CH_2NR''_2$, where N is nitrogen, $R'_1$ and $R''_2$ are each independently a hydrogen or alkyl moiety and n is an independent integer lying in the range of 1 to 10.

In an embodiment of the present invention, amido amines or polyamido amines are prepared by reacting polyethylene terephthalate (PET) with amines or polyamines.

In yet another embodiment of the present invention, the terephthalamide and polyisocyanate can be reacted together in a variety of ratios with the range of (0.05 to 30%) and under different set of reaction conditions.

In an embodiment of the present invention, amido amines or polyamido amines are present in 0.05-30% wt/wt of bitumen, the isocyanates or polyisocyanates are present in 0.05-30% wt/wt of bitumen and the reaction is conducted at a temperature of 50° C. to 190° C. for a period of 10 minutes to 8 hours.

In accordance with the present invention, modified bitumen is prepared by reacting amido amines or polyamido amines with isocyanate or polyisocyante in bitumen. When the reactant components in bitumen are reacted together, they form a statistical mixture of terephthalamide compounds encompassed by the general structural formula $R'_1NCH_2CH_2\text{---}(CH_2CH_2NH)_n\text{---}CO\text{---}C_6H_4\text{---}CO\text{---}(NHCH_2CH_2)_nCH_2CH_2NR''_2$, where N is nitrogen, $R'_1$ and $R''_2$ are each independently a hydrogen or alkyl moiety and n is an independent integer lying in the range of 1 to 10. $R'_1N$ and or $R''_2N$ could also be alkyl or substituted aromatic groups or an oligomer derived from aminolysis of PET. In one embodiment, $R'_1N$ and/or $R''_2N$ is alkyl or substituted aromatic group or an oligomer derived from aminolysis of PET.

In accordance with the present invention, amines or polyamines are selected from the group comprising ethylene diamine, triethylene tetramine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, N-(2-aminoethyl)piperazine, 1,4-bis(2-aminoethyl)piperazine, an aromatic polyamine such as phenylene and napthylene diamines or hydrazines such as hydrazine, organo-hydrazines having hydrocarbon-based substituents of up to about 30 carbon atoms.

The isocyantes or polyisocyanates used in accordance with the present invention are selected from the group comprising hexamethylene diisocyanate (HDI), trimethyl hexamethylene diisocyanate (HMDI), ethylene diisocyanate, ethylidene diisocyanate, propylene, butylene diisocyanate, diisocyanate dichlorohexaméthylène, furfurylidene diisocyanate, Cycloaliphatic polyisocyanates, like isophorone diisocyanate (IPDI), cyclopentylene-1,3-diisocyanate, cyclohexylenedimethylene 1 diisocyanate, cyclohexylene-1,2-diisocyanate, and mixtures thereof, aromatic polyisocyanates like the 4,4'-diphenyl diisocyanate (MDI) and its isomers, such as 2,4'- and 2,2'-diphenylmethane diisocyanate, toluene diisocyanate (TDI) and isomers thereof, particularly the 2,4- and 2,6-toluene diisocyanate, 2,2-diphenylpropane-4'-diisocyanate, p-phenylene diisocyanate, m-phenylene diisocyanate, xylene diisocyanate, 1,4-naphthalene diisocyanate, 1,5-naphthalene diisocyanate, azobenzene-4,4'-diisocyanate, diphenyl sulfone-4,4'-diisocyanate, 1-chlorobenzene-2,4-diisocyanate, 4 4',4"-triisocyanatotriphériyl methane, 1,3,5-triisocyanato-tetraisocyanate, and mixtures thereof.

The polyisocyante as described herein is diisocyanates, more specifically MDI and its isomers, TDI and its isomers, the HDI, the IPDI and derivatives thereof.

Various solvents suitable for carrying out the polymerization according to the invention include Dimethyl formamide (DMF), Dimethyl sulphoxide (DMSO), Acetone, Methylethyl ketone, Tetrahydrofuran (THF), Ethyl acetate, Benzene, Toluene, Chlorobenzene, Hexane, Cylohexane, Xylene and Dichloro Methane (DCM) etc.

In another aspect of the present invention, a bituminous concrete comprising bituminous cement mixture and an aggregate.

Further, the process of the present invention is performed by way of two alternative processes:

1. When Isocyanates are Added in Bitumen:

Different polyamido amines/amido amines from PET were synthesized in a separate reaction vessel using method reported in the earlier patent Application number: PCT/IB2013/050974. For the present invention bitumen, polyamido amines/amido amines/terephthalamide and polyisocyanate are reacted to obtain a bituminous mix.

2: When Isocyanates are Added Outside Bitumen:

Polyurethanes were synthesized using a one-step polymerization reaction method. Poly amidoamine and/or terephthalamide derivative prepared by reacting PET and ethanol amine, triethanolamine, amine or polyamine is reacted with Polyethylene glycol (PEG) (PEG200,PEG400, PEG6000) Polyethylene glycol (PEG) suitable for use in the present discloses includes, but is not restricted to, various low molecular weight PEG and also high molecular weight PEG and Dibutyltin dilaurate (DBTDL) in a solvent. After the completion of the reaction, isocyanate/polyisocyanate were added. Removal of solvent was accomplished by using vacuum distillation. The above product was added to bitumen and to form polymer modified bitumen (PMB).

Having described the basic aspects of the present invention, the following non-limiting examples illustrate specific embodiment thereof.

Example 1

(When Isocyanates are Added in Bitumen)

Different polyamido amines from PET were synthesized in a separate reaction vessel using method reported in the earlier patent Application number: PCT/IB2013/050974. For present invention, a three necked, 500 ml round-bottom flask equipped with a heating mantle, overhead stirrer, water condenser, nitrogen gas sparging tube and a thermo well pocket containing thermometer (40° C. to 300° C. range) was used. The flask was charged with bitumen, polyamido amines in 3% Wt/Wt of bitumen, polyisocyanate in 1.5% Wt/Wt of bitumen to form modified bitumen. The temperature is 140° C. and duration of reaction is 2 hours. The bituminous mix thus prepared was tested for different lab tests.

Physico-Chemical Properties:

The physicochemical properties of the modified bitumen samples during this invention indicate that it has met the plastomer specification. The following were used for the experiment:

VG-10 Bitumen

Bitumen supplied from Mathura Refinery having viscosity grade-10 (i.e. 80/100 penetration grade).

Properties of Mathura Refinery having VG-10 Bitumen:

| Properties | Test values | Referral specifications |
| --- | --- | --- |
| Penetration | 85 | IS1203/1978 |
| Absolute Viscosity at 60° C. | 1145 | IS1206 (PART2) |
| Kinematic Viscosity at 135° C. | 302 | IS1206 (PART3) |
| Softening Point in ° C. | 46 | IS 1205/1978 |
| Ductility at 27° C. | 100+ | IS 1208:1978 Min |
| Ductility after TFOT at 25° C. in cm | 100+ | IS 1208:1978 Min |

TEPA-Modified:

TEPA-Modified Bitumen comprising of terephthalamide [Aminolysis product synthesis of PET with tetraethylenepentamine (TEPA)], isocyanate and Bitumen.

BHETA Modified:

BHETA-Modified Bitumen comprising of terephthalamide (synthesis of PET with ethanol amine), isocyanate and Bitumen.

TEPA-Modified (1):

TEPA-Modified (1), Bitumen comprising of terephthalamide (Aminolysis product synthesis of PET with tetraethylenepentamine), isocyanate and Bitumen (The Ratio of isocyante, terephthalamide and bitumen are 0.5:1:98.5 wt/wt).

TEPA-Modified (2):

TEPA-Modified Bitumen comprising of terephthalamide (Aminolysis product synthesis of PET with tetraethylenepentamine), isocyanate and Bitumen (The Ratio of isocyante, terephthalamide and bitumen are 0.5:1.5:98 wt/wt).

BHETA Modified (1):

BHETA-Modified Bitumen comprising of terephthalamide (synthesis of PET with ethanol amine), isocyanate and Bitumen (The Ratio of isocyante, terephthalamide and bitumen are 0.5:1:98.5 wt/wt).

BHETA Modified (2):

BHETA-Modified Bitumen comprising of terephthalamide (synthesis of PET with ethanol amine), isocyanate and Bitumen (The Ratio of ISOCYANTE, terephthalamide and bitumen are 0.5:1.5:98 wt/wt).

TABLE 1

Physico-Chemical Properties

| Properties | VG-10 Bitumen | TEPA-Modified | BHETA Modified | PMB-grade-3 (IRC:SP:53-2010) | Specification |
| --- | --- | --- | --- | --- | --- |
| Penetration 25° C. (100 g, 5 s), 0.1 mm | 84 | 67 | 66 | 60-120 | IS1203/1978 |
| Softening Point (Ring and Ball), ° C., Minimum | 46 | 51.5 | 52 | 50 Min | IS 1205/1978 |
| Ductility at 27° C. (5 Cm/Min) | 100 | 90+ | 40 | — | IS 1208: 1978 Min |
| Viscosity (150° C.) Using Rotational Viscometer (Poise) | 1.57 | 2.78 | 2.95 | 1-3 poise | ASTM:D-4402 |
| Separation Difference in Softening Point (R&B) ° C. Max | — | 2 | 2.7 | 3 Max | (IRC:SP 53-2010) |

Dynamic Shear Rheometer

DSR method was determined to be the main method for measuring the deformation characteristics of road surfaces in the future. The test procedure used to measure the G*/Sin(δ), a parameter of rutting-assistance of the original bitumen and RTFOT test-aged bitumens. The Superpave specification states that, at the maximum pavement design temperature, the G*Sin(δ) value should be at least 1.0 kPa for original bitumen and 2.2 kPa in order for RTFOT-aged bitumen to resist rutting.

TABLE 2

Dynamic Shear Rheometer

| Properties | Test Temperature | VG-10 Bitumen G*/Sin (delta) | TEPA-Modified G*/Sin (delta) | BHETA Modified G*/Sin (delta) | Passing limit of G*/Sin (delta) (ASTM:D-7175) | PMB-grade-3 (IRC:SP:53-2010) |
|---|---|---|---|---|---|---|
| DSR Neat | 58° C. | 2.14 | 5.32 | 4.93 | 1.0 | 58° C. Min Required Temperature |
|  | 64° C. | 0.92 | 2.55 | 2.35 |  |  |
|  | 70° C. | 0.43 | 1.23 | 1.16 |  |  |
|  | 76° C. | 0.2 | 0.639 | 0.519 |  |  |
| DSR RTFO Age | 58° C. | 3.99 | 11.34 | 10.67 | 2.20 | 58° C. Minimum Required Temperature |
|  | 64° C. | 1.71 | 5.49 | 4.96 |  |  |
|  | 70° C. | 0.61 | 2.84 | 2.22 |  |  |
|  | 76° C. | 0.27 | 1.27 | 1.01 |  |  |

The modified asphalt exhibiting improved stiffness values for original unaged modified bitumen binder as well as RTFO age modified bitumen binder, which when tested with DSR at temperature ranging from 58-82° C., exhibits G*/Sin (delta) values are higher than normal bitumen. The table showed that the modified bitumen has G*/Sin(delta) are 1.23 and 1.16 kPa for unaged and 2.84 and 2.22 kPa at 70° C. for RTFO age, TEPA-Modified and BHETA Modified bitumen respectively.

Bending Beam Rheometer

In order to further examine low temperature thermal cracking properties, thin beams of modified bitumen were tested for creep stiffness at low temperature using the Bending Beam Rheometer (BBR). The maximum stiffness criteria of 300 MPa and the minimum m-value criteria of 0.300 recommended in Superpave binder specifications generally appear to be reasonable in mitigating low-temperature cracking.

TABLE 3

Bending Beam Rheometer

| Properties Temperature | VG-10 Bitumen Stiffness | m-Value | TEPA-Modified Stiffness | m-Value | BHETA Modified Stiffness | m-Value | Specification |
|---|---|---|---|---|---|---|---|
| −6° C. | 74 | 0.402 | 41.3 | 0.495 | 35.3 | 0.508 | ASTM:D 6648 |
| −12° C. | 147 | 0.362 | 93.3 | 0.432 | 110 | 0.381 | Maximum |
| −18° C. | 395 | 0.288 | 256 | 0.326 | 280 | 0.292 | Stiffness = 300 MPa and Minimum m-value = 0.300 |

The modified asphalt exhibiting improved creep stiffness and m-value were tested at low temperature from −42° C. to 0° C. according to SHARP Bending Beam Creep Stiffness Test AASHTO TP1. The results disclose that the modified binder in this invention were more flexible after aging process. This showed the direct effect of aging on bitumen viscoelastic behaviors and increasing the bitumen plastic behavior. A comparative study of the BBR test data for the modified bitumen is given in the above table. The table showed that the modified bitumen has stiffness 256 and 280 MPa and m-value 0.326 and 0.292 at −18° C. for TEPA-Modified and BHETA Modified bitumen respectively. This discloses the better performance of our modified bitumen than the other PMB available in the market.

Rutting Characteristics

Wheel tracking test is a simulative laboratory method of assessing resistance to permanent deformation and correlate their results with in-service pavement rutting. The modified asphalt exhibits improved rutting resistance 3.2 and 1.5 mm and 2.96 and 1.82 for different composition of TEPA-Modified and BHETA Modified bitumen respectively.

TABLE 4

Rutting Characteristics

| Properties | VG-10 Bitumen | TEPA-Modified (1) | TEPA-Modified (2) | BHETA Modified (1) | BHETA Modified (2) | Specification |
|---|---|---|---|---|---|---|
| Rut Depth | 4.8 | 3.2 | 1.5 | 2.96 | 1.82 | (EN12697-22: 2003 + A1) |

Marshall Stability Test

Marshall Stability test is used for evaluation of the resistance to plastic deformation of a compacted cylindrical specimen of bituminous pavement. Marshall Stability Test has stability-flow tests. The Marshall stability of the bituminous pavement is defined as the maximum load carried by the compacted cylindrical specimen at a standard test temperature of 60° C. The flow value is the deformation that the test compacted cylindrical specimen undergoes during loading up to the maximum load mm units. According to IRC:SP-53 specification the marshall strength and flow value for Hot Climate, Marshall Stability is 12KN and Flow value is 2.5-4 mm and for Cold Climate the Marshall Stability is 10 KN and Flow value is 2.5-4 mm and for High Rain Fall area Marshall Stability: 12KN, Flow value is 3.0-4.5 mm at 60° C., respectively.

TABLE 5

Marshall Stability Test (Marshall Strength KN/Flow in mm)*
Compaction temp: 141° C.

| Binder content | VG-10 Bitumen | TEPA-Modified | BHETA Modified | Specification |
|---|---|---|---|---|
| 5% | 11.9/2.24 | 14.54/3.66 | 11.28/2.32 | ASTM:D-6927 |
| 5% | 12.30/2.45 | 13.44/3.75 | 12.47/2.80 | ASTM:D-6926 |
| 5% | 13.15/2.80 | 12.55/3.45 | 10.92/2.12 | IRC:53-2010 |
| Average of 5% dosage | 12.45/2.49 | 13.51/3.62 | 11.55/2.41 | Hot Climate: Marshall Stability: |
| 5.5% | 13.55/2.39 | 17.75/3.45 | 14.09/3.89 | 12 KN, Flow at |
| 5.5% | 12.98/2.55 | 16.25/4.08 | 14.20/3.46 | 60° C. = 2.5-4 mm |
| 5.5% | 14.59/2.52 | 16.8/3.67 | 13.89/3.21 | Cold Climate: |
| Average of 5.5% dosage | 13.67/2.48 | 16.93/3.73 | 14.06/3.52 | Marshall Stability: 10 KN, Flow at |
| 6% | 13.55/2.39 | 20.15/5.08 | 15.23/5.23 | 60° C. = 3.5-5 mm |
| 6% | 14.58/3.59 | 17.71/4.35 | 16.82/5.03 | For High Rain Fall |
| 6% | 14.09/3.12 | 20.48/4.05 | 14.67/4.87 | Marshall Stability: |
| Average of 6% dosage | 14.07/3. | 19.44/4.49 | 15.57/5.04 | 12 KN, Flow at 60° C. = 3.0-4.5 mm |

The modified asphalt exhibits improved Marshall Stability and flow value. The results indicate that stability increases on all formulations meets all types of climatic condition in the IRC:53-2010.

Hot Water Stripping Test (ASTM D 3625-96 (Reapproved 2005))

Figure 1:
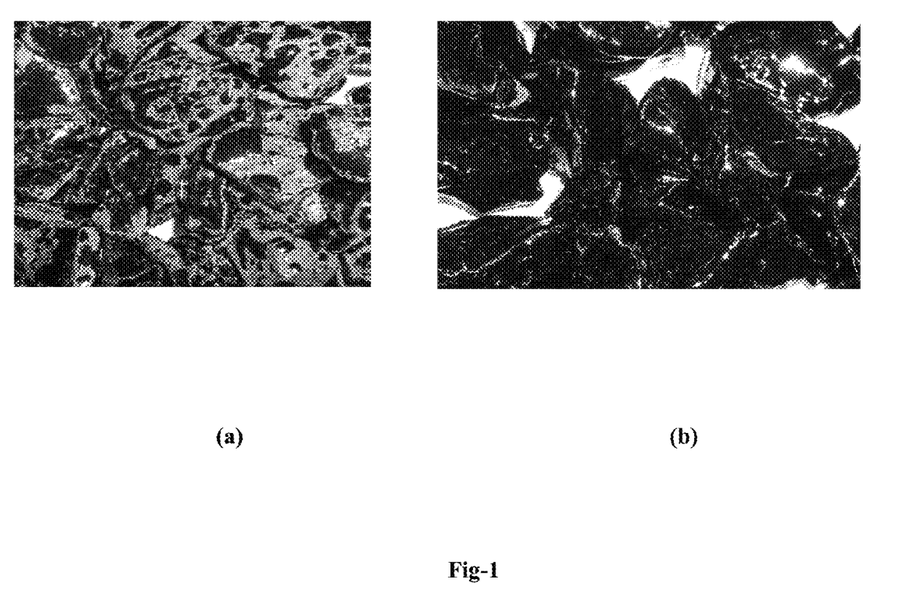
FIG. 1: Shows Hot Water Stripping Test (ASTM D 3625-96 (Reapproved 2005))
(a) Neat VG-10 Bitumen Binder;
(b) Polymer Modified Bitumen Binder of the Present Invention.
Figure 2:
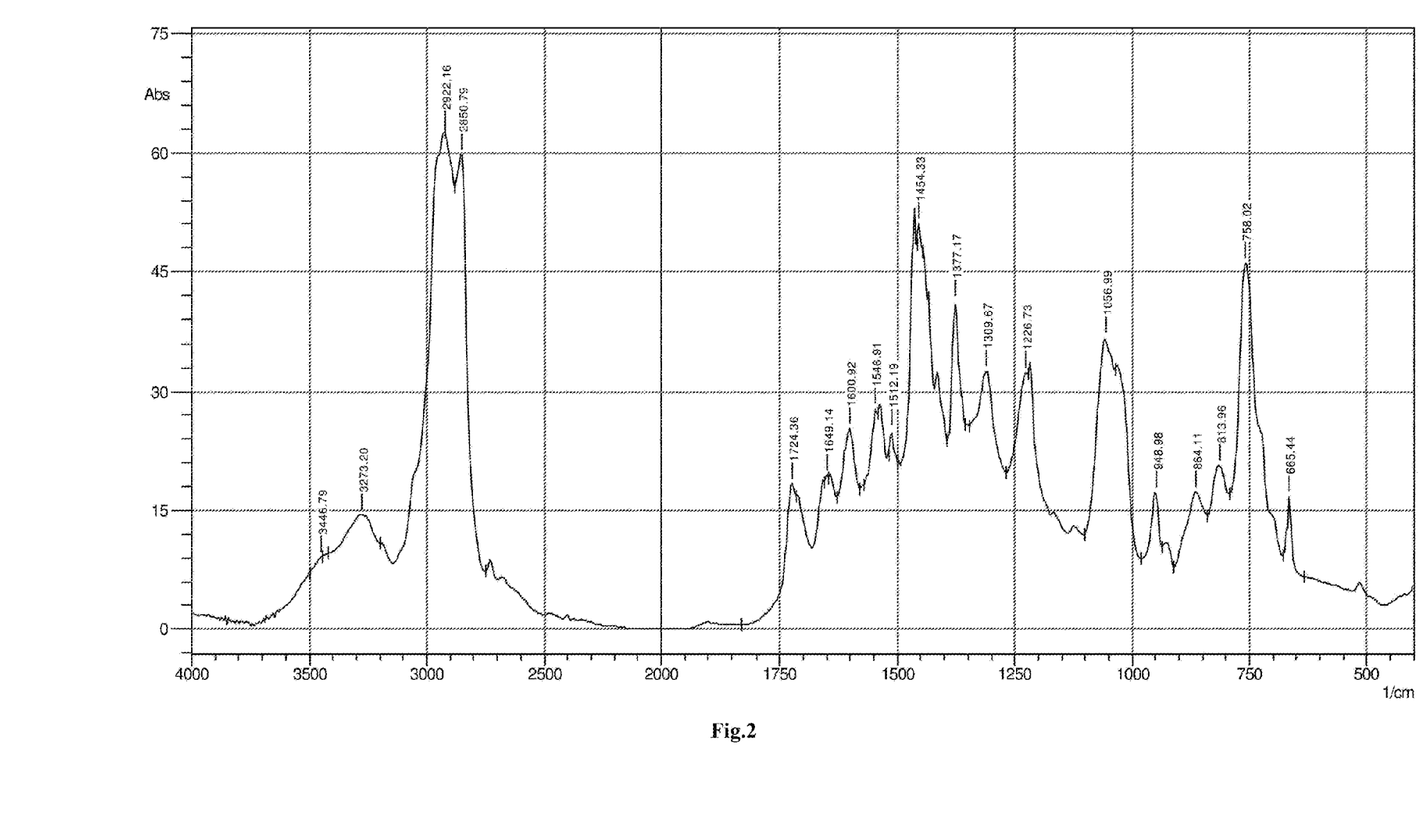
FIG. 2: IR Data of BHETA Terephthalamide(Bis(2-hydroxyethylene) terepthalamide) Derived PMB.
Figure 3:
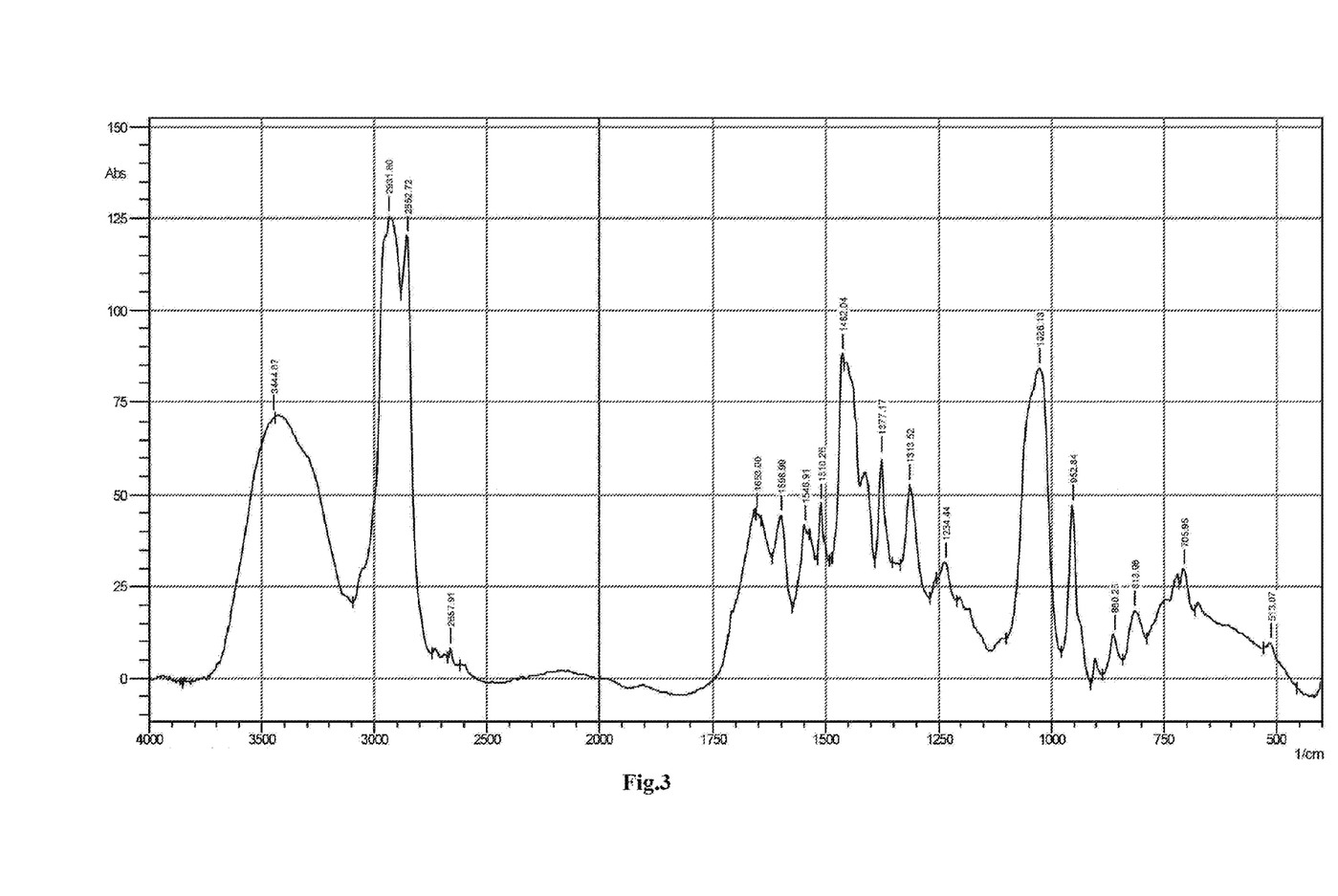
FIG. 3: IR Data of TETA Terephthalamide derived PMB.

The Boiling Water Test (ASTM D3625) is a subjective test for the effects of moisture of bituminous mixes. It is used primarily as an initial screening test of anti-stripping agent in bituminous mixes. The results clearly demonstrate the good antistripping behaviour of modified bituminous mixes. The results disclose that the modified binder in this invention shows improved antistripping behavior.

Example 2

(When Isocyanates are Added Outside Bitumen)

Polyurethanes were synthesized using a one-step polymerization reaction method. BHETA 0.04155 mol, Polyethylene glycol (PEG) (0.01785 mol) and DBTDL (0.001167 mol) were dissolved in 250 mL of DMSO in a two-necked round bottom flask equipped with a condenser and stirrer. The temperature was raised to 110° C. Then 1.8 mol of MDI were added and the reaction mixer stirred vigorously. After completion of reaction, removal of solvent was accomplished by using vacuum distillation. 3% of the above product was added to bitumen and stirred for 2 h at 140° C. to formed polymer modified bitumen (PMB). Properties of resultant modified bitumen are shown below.

TABLE 6

Physico-Chemical Properties

| Properties | VG-10 Bitumen | TEPA-EXSITU PMB | BHETA-EXSITU PMB | PMB-grade-3 (IRC:SP:53-2010) | Specification |
|---|---|---|---|---|---|
| Penetration 25° C. (100 g, 5 s), 0.1 mm | 84 | 71 | 69 | 60-120 | IS1203/1978 |
| Softening Point (Ring and Ball), ° C., Minimum | 46 | 50.7 | 51 | 50 Min | IS 1205/1978 |
| Viscosity (150° C.) Using Rotational Viscometer (Poise) | 1.57 | 1.96 | 2.16 | 1-3 poise | ASTM:D-4402 |
| Separation Difference in Softening Point (R&B) ° C. Max | — | 2.5 | 2.7 | 3 Max | (IRC:SP 53-2010) |

The results indicate that all physico-chemical properties of all polymers modified bitumen binder (made through ex-situ polymerization) and meet all requirements according to the IRC: 53-2010.

TABLE 7

Dynamic Shear Rheometer (DSR)

| Properties | Test Temperature | EXSITU-TEPA-PMB G*/Sin(delta) | EXSITU BHETA PMB G*/Sin(delta) | Passing limit of G*/Sin(delta) (ASTM:D-7175) | PMB-grade-3 (IRC:SP:53-2010) |
|---|---|---|---|---|---|
| DSR Neat | 58° C. | 4.63 | 4.89 | 1.0 | 58° C. Min Required Temperature |
|  | 64° C. | 1.96 | 2.01 |  |  |
|  | 70° C. | 0.91 | 0.95 |  |  |
| DSR RTFO Age | 58° C. | 7.51 | 10.96 | 2.20 | 58° C. Minimum Required Temperature |
|  | 64° C. | 3.46 | 3.84 |  |  |
|  | 70° C. | 1.72 | 1.86 |  |  |

The Superpave specification states that in alter to provide suitable resistance against rutting at the maximum pavement design temperature of a bituminous product the G*/Sin(δ) value should be at least 1.0 kPa for neat bitumen and 2.2 kPa for RTFOT-aged bitumen samples. DSR studies were done on samples of TEPA-Modified bitumen, BHETA-modified bitumen. The table shows that all modified bitumen have G*/Sin(δ) values of 1.96 and 2.01 kPa for unaged and 3.46 and 3.84 kPa at 64° C. for the RTFO aged TEPA-terephthalamide modified bitumen and BHETA-terephthalamide modified bitumen, respectively. Thus, both modified bitumen samples under un-aged conditions as well as RTFO aged conditions showed acceptable values up to a temperature of 64° C. against a lower value of 64° C.

TABLE 8

Bending Beam Rheometer

Properties

| Temperature | TEPA-Modified Stiffness | m-Value | BHETA Modified Stiffness | m-Value | Specification |
|---|---|---|---|---|---|
| −6° C. |  | Not Applicable |  |  | ASTM:D 6648 |
| −12° C. | 103 | 0.466 | 99.7 | 0.448 | Maximum |
| −18° C. | 296 | 0.348 | 250 | 0.346 | Stiffness = 300 MPa and Minimum m-value = 0.300 |

A comparative study of BBR test data for neat and modified bitumen samples is given in the Table 4.4. The table showed that the modified bitumen have stiffness 296, 250 MPa and m-value 0.348 and 0.346 at −18° C. for TEPA-Modified and BHETA-Modified bitumen respectively. This means that, BHETA-modified and TEPA-Modified bitumen samples are consistently matched the desired value limits at −18° C. and thus these modified bitumen binders will be more resistant to low temperature cracking.

We claim:

1. A process for preparing modified bitumen, the process comprising of:
   (i) reacting polyethylene terephthalate (PET) with amines or polyamines to obtain amido amines or polyamido amines;
   (ii) reacting the amido amines or polyamido amines as obtained in step (i) with isocyanate or polyisocyanate and bitumen in a solvent to obtain modified bitumen.

2. The process as claimed in claim 1, wherein amido amines or polyamido amines are reacted with isocyanate or polyisocyanate, prior to reacting with bitumen.

3. The process as claimed in claim 1, wherein amido amines or polyamido amines; isocyanate or polyisocyanate; and bitumen are reacted simultaneously.

4. The process as claimed in claim 1, wherein amido amines, or polyamido amines are present in 0.05-30% wt/wt of bitumen.

5. The process as claimed in claim 1, wherein the isocyanates or polyisocyanates are present in 0.05-30% wt/wt of bitumen.

6. The process as claimed in claim 1, wherein the reaction is conducted at a temperature of 50° C. to 190° C.

7. The process as claimed in claim 1, wherein the reaction is conducted for a period of 10 minutes to 8 hours.

8. The process as claimed in claim 1, wherein amines or polyamines are selected from the group comprising ethylene diamine, triethylene tetramine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, N-(2-aminoethyl)piperazine, 1,4-bis(2-aminoethyl)piperazine, an aromatic polyamine selected from phenylene and napthylene diamines or hydrazines such as hydrazine, organo-hydrazines having hydrocarbon-based substituents of up to about 30 carbon atoms.

9. The process as claimed in claim 1, wherein isocyantes or polyisocyanates are selected from the group comprising hexamethylene diisocyanate (HDI), trimethyl hexamethylene diisocyanate (HMDI), ethylene diisocyanate, ethylidene diisocyanate, propylene, butylene diisocyanate, diisocyanate dichlorohexaméthylène, furfurylidene diisocyanate, cycloaliphatic polyisocyanates, like isophorone diisocyanate (IPDI), cyclopentylene-1,3-diisocyanate, cyclohexylenedimethylene-1-diisocyanate, cyclohexylene-1,2-diisocyanate, and mixtures thereof, aromatic polyisocyanates like the 4,4'-diphenyl diisocyanate (MDI) and its isomers, such as 2,4'- and 2,2'-diphenylmethane diisocyanate, toluene diisocyanate (TDI) and isomers thereof, particularly the 2,4- and 2,6-toluene diisocyanate, 2,2-diphenylpropane-4'-diisocyanate, p-phenylene diisocyanate, m-phenylene diisocyanate, xylene diisocyanate, 1,4-naphthalene diisocyanate, 1,5-naphthalene diisocyanate, azobenzene-4,4'-diisocyanate, diphenyl sulfone-4,4'-diisocyanate, 1-chlorobenzene-2,4-diisocyanate, 4,4',4"-triisocyanatotripheriyl methane, 1,3,5-triisocyanato-tetraisocyanate, and mixtures thereof.

10. The process as claimed in claim 1, wherein the solvent is selected from dimethyl formamide (DMF), dimethyl sulphoxide (DMSO), acetone, methylethyl ketone, tetrahydrofuran (THF), ethyl acetate, benzene, toluene, chlorobenzene, hexane, cylohexane, xylene and dichloro methane (DCM).

11. The process as claimed in claim 1, wherein the polyisocyante is diisocyanates, selected from MDI and its isomers, TDI and its isomers, HDI, IPDI and derivatives thereof.

12. The process as claimed in claim 1, wherein amido amines or polyamido amines and isocyanate or polyisocyanate are reacted to obtain a polyurea.

13. A bituminous cement mixture comprising polyurethane or polyurea polymers as claimed in claim 12, in body of bitumen.

14. A bituminous concrete comprising bituminous cement mixture of claim 1 and an aggregate.

* * * * *